R. R. MAXWELL.
SAW SHARPENER.
APPLICATION FILED DEC. 10, 1912.
1,072,967.
Patented Sept. 9, 1913.
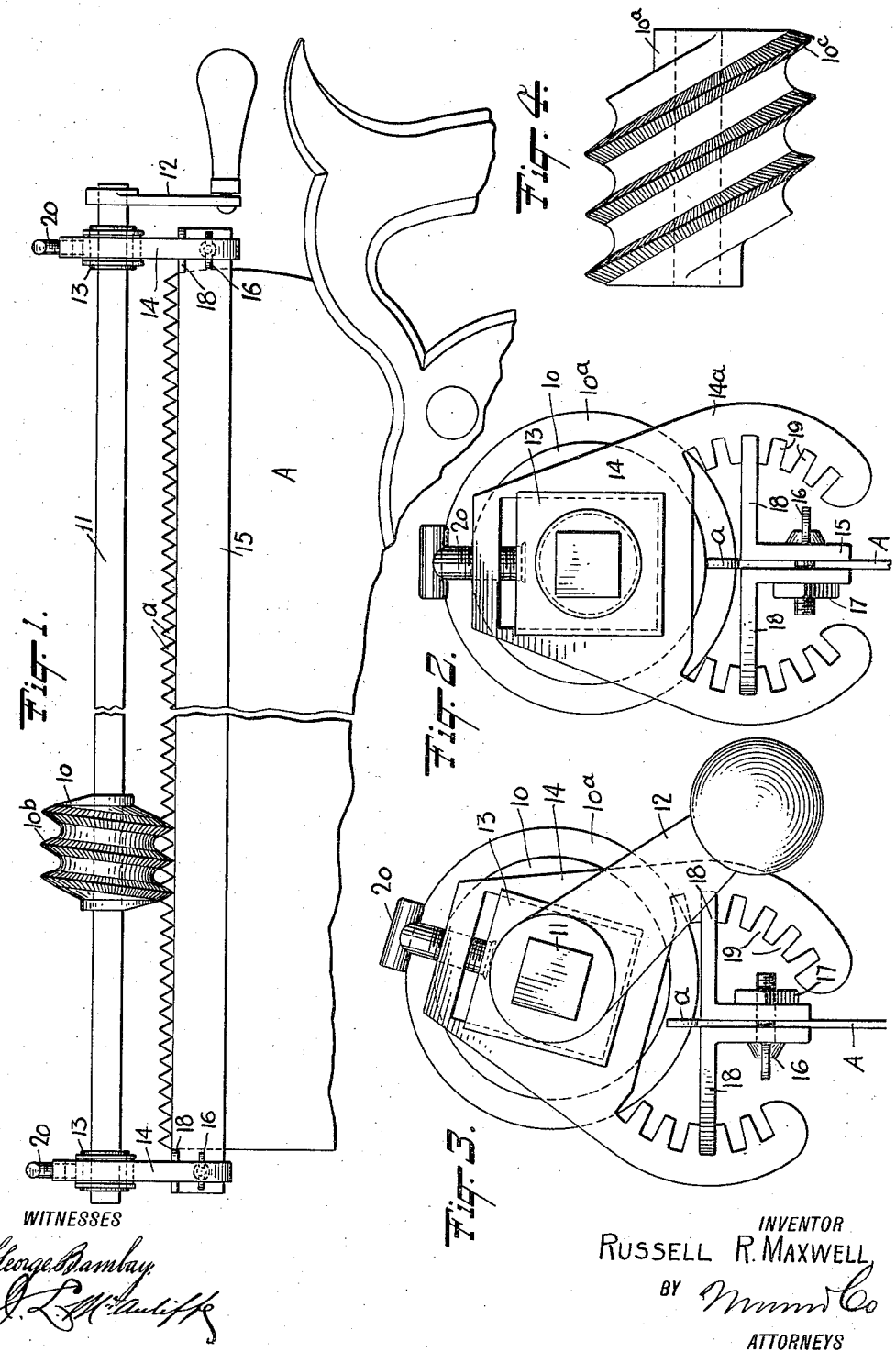
WITNESSES
INVENTOR
RUSSELL R. MAXWELL
BY
ATTORNEYS

UNITED STATES PATENT OFFICE.

RUSSELL RICHARD MAXWELL, OF MANSFIELD, OHIO.

SAW-SHARPENER.

1,072,967.  Specification of Letters Patent.  Patented Sept. 9, 1913.

Application filed December 10, 1912. Serial No. 735,933.

*To all whom it may concern:*

Be it known that I, RUSSELL R. MAXWELL, a citizen of the United States, and a resident of Mansfield, in the county of Richland and State of Ohio, have invented a new and Improved Saw-Sharpener, of which the following is a full, clear, and exact description.

An object of my invention is to provide a saw sharpener in which the sharpening device is mounted on a shaft for revoluble movement, and in which the sharpening device will automatically travel along the shaft and along the saw to engage different teeth in succession as the shaft is turned.

In carrying out my invention use is made of a sharpening head having a spiral rib of a character to effect the sharpening operation.

The invention will be more particularly explained in the specific description hereinafter given.

Reference is to be had to the accompanying drawings forming a part of this specification, in which similar characters of reference indicate corresponding parts in all the views.

Figure 1 is a side elevation of a saw sharpener embodying my invention; Fig. 2 is an end view with the operating handle omitted; Fig. 3 is a view similar to Fig. 2, but including the operating handle and showing the device in a different adjustment from that illustrated in Fig. 2; and Fig. 4 is a detached view of the sharpening head, illustrating a modification.

In constructing a saw sharpener embodying my invention in accordance with the illustrated example, the cylindrical sharpener head 10 is formed with a spiral rib $10^b$, and is mounted on a shaft 11 for sliding movement, as for instance by keying the head, or giving it a square fit on the shaft. An operating handle 12 is provided at one end of the shaft, and the latter revolves in bearings 13 in end frames 14, which are supported from a saw clamp consisting of longitudinal plates 15 to embrace the saw blade A between them, the ends of the said plates being provided with a wing bolt 16 and a nut 17, to firmly hold the device in position on the saw, it being understood that the saw in practice is also held in a vise or the like (not shown).

The clamp plates 15 are provided with lateral ears 18 which are received in recesses 19 in dependent side arms $14^a$ of the end frames 14. A series of recesses 19 is formed in the inner edge of each arm $14^a$, and the recesses are in alinement to receive the opposite ears 18 of the clamp plates. Upon comparing Figs. 2 and 3, it will be seen that the end frames may be shifted relatively to the clamp by engaging the ears 18 in different pairs of recesses 19 in order to dispose the sharpener head 10 slightly to either side of the saw blade A, so that the spiral rib $10^b$ may be properly positioned to file or sharpen the saw teeth $a$ at a given angle. The angles for different saw filing may be varied by shifting the position of the device on the saw, or lengthening the pitch of the spiral, and also by providing sharpening heads having spirals of different circumferences. The bearings 13 in the frames 14 may be held by screws 20.

In the form shown in Fig. 4 it will be seen that the spiral rib $10^c$ on the head $10^a$, has a greater pitch than the rib $10^b$ in Fig. 1, and will therefore sharpen saw teeth at a different angle; also in Fig. 4, the convolutions of the spiral rib are right-handed while in Fig. 1 the convolutions are left hand. The character of the ribs will be such as to produce the desired sharpening effect, the ribs being preferably of steel and having cuts similar to a file.

In practice, the convolutions of the sharpening rib may be such as to take alternate teeth, and after the turning of the shaft 11 has caused the sharpening head to travel one or more times the head may be shifted to act on the teeth skipped in the first operation.

The described construction affords a practical means for carrying my invention into effect, and I would state in conclusion that I do not limit myself strictly to the mechanical details herein illustrated except as limited by the appended claims, since manifestly the same can be considerably varied without departure from the spirit of the invention.

Having thus described my invention, I claim as new, and desire to secure by Letters Patent:—

1. The combination of supporting means adapted for lateral adjustment, a shaft carried thereby, and a sharpener head mounted to rotate with the shaft and to travel thereon and provided with a spiral sharpening member.

2. In a saw sharpener, the combination with a clamp adapted to hold the sharpener to a saw, of end frames adjustably engaging said clamp to tilt laterally, a shaft mounted to revolve in said frames, and a sharpener head mounted on said shaft, to rotate therewith and to travel thereon.

3. In a saw sharpener, the combination of clamp plates adapted to receive a saw blade therebetween, and provided with lateral ears, end frames formed with opposite series of recesses adapted to receive the said ears to position the end frames in different angular relation to the clamp, a shaft mounted to revolve in said frames, and a sharpener head mounted on the shaft to rotate therewith and to travel thereon, said head being formed with a spiral sharpening rib.

In testimony whereof I have signed my name to this specification in the presence of two subscribing witnesses.

RUSSELL RICHARD MAXWELL.

Witnesses:
L. H. BEAM,
MARIE MELCHING.

---

Copies of this patent may be obtained for five cents each, by addressing the "Commissioner of Patents, Washington, D. C."